US009358848B2

(12) United States Patent
Voith et al.

(10) Patent No.: US 9,358,848 B2
(45) Date of Patent: Jun. 7, 2016

(54) DEVICE FOR ADAPTING THE TIRE PRESSURE DURING TRAVEL

(71) Applicant: KNORR-BREMSE Systeme fuer Nutzfahrzeuge GmbH, Munich (DE)

(72) Inventors: Andras Voith, Budapest (HU); Janos Toth, Kecskemet (HU); Attila Mihalyi, Kecskemet (HU); Kornel Kantor, Kecskemet (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 301 days.

(21) Appl. No.: 14/052,214

(22) Filed: Oct. 11, 2013

(65) Prior Publication Data
US 2014/0034202 A1 Feb. 6, 2014

Related U.S. Application Data

(63) Continuation of application No. PCT/EP2012/056629, filed on Apr. 12, 2012.

(30) Foreign Application Priority Data

Apr. 14, 2011 (DE) .................... 10 2011 017 118

(51) Int. Cl.
*B60C 29/06* (2006.01)
*B60C 23/00* (2006.01)

(52) U.S. Cl.
CPC ............... *B60C 29/06* (2013.01); *B60C 23/003* (2013.01)

(58) Field of Classification Search
CPC ...... B60C 23/00; B60C 29/06; B60C 23/003; B60C 23/10
USPC ............... 152/415, 416, 417; 137/492.5, 488, 137/227, 224
See application file for complete search history.

(56) References Cited

U.S. PATENT DOCUMENTS 2,452,527 A * 10/1948 Hurst .................... B60C 23/003
152/417
4,313,483 A * 2/1982 Brockmann .......... B60C 23/003
116/34 R (Continued)

FOREIGN PATENT DOCUMENTS

DE 26 30 511 A1 1/1978
DE 2929894 * 8/1979

(Continued)

OTHER PUBLICATIONS

International Preliminary Report on Patentability (PCT/IB/326 & PCT/IB/373) and Written Opinion (PCT/ISA/237) dated Oct. 24, 2013 (eight (8) pages).

(Continued)

*Primary Examiner* — S. Joseph Morano
*Assistant Examiner* — Jean Charleston
(74) *Attorney, Agent, or Firm* — Crowell & Moring LLP

(57) ABSTRACT

A device for adapting actual tire pressure of a tire of a wheel of a vehicle axle to a current setpoint tire pressure during travel includes a chassis-side central device and a wheel-related pneumatic pressure-control device. The pressure control device includes a second connection which is at the actual tire pressure. A control valve with an open position connects a first connection to the second connection, and with a blocking position blocks this connection. A pilot control valve performs pilot control of the control valve. The pressure control device also has a bypass line, which bypasses the control valve and the pilot control valve, connects the first connection to the second connection, and has a non-return valve which opens in the inflation direction of the tire and blocks in the deflation direction of the tire.

11 Claims, 5 Drawing Sheets

(56) References Cited

U.S. PATENT DOCUMENTS

| | | | |
|---|---|---|---|
| 4,421,151 A | 12/1983 | Stumpe | |
| 4,640,331 A * | 2/1987 | Braun | B60C 23/003 137/224 |
| 5,674,332 A * | 10/1997 | Battocchio | B60C 23/003 152/416 |
| 6,336,481 B1 * | 1/2002 | Tigges | B60C 23/003 141/38 |

FOREIGN PATENT DOCUMENTS

| | | |
|---|---|---|
| DE | 28 23 045 A1 | 11/1979 |
| DE | 29 29 894 A1 | 2/1981 |
| DE | 31 08 247 A1 | 9/1982 |
| DE | 32 46 601 A1 | 6/1984 |
| DE | 33 00 457 A1 | 7/1984 |
| DE | 38 36 105 A1 | 4/1990 |
| DE | 103 60 764 B3 | 10/2005 |
| EP | 0 368 365 A1 | 5/1990 |
| WO | WO 8908031 * | 8/1989 |
| WO | WO 89/08031 A1 | 9/1989 |

OTHER PUBLICATIONS

German Search Report with English translation dated Aug. 2, 2011 (twelve (12) pages).

International Search Report with English translation dated Jul. 6, 2012 (four (4) pages).

* cited by examiner

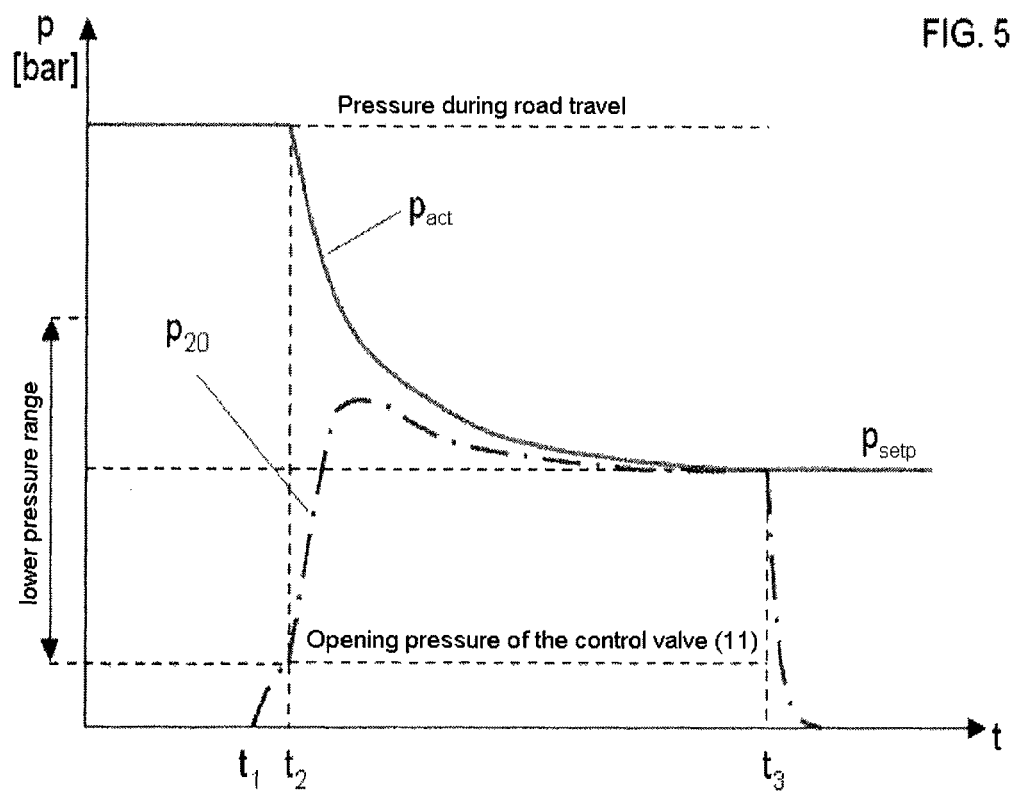

DEVICE FOR ADAPTING THE TIRE PRESSURE DURING TRAVEL

CROSS REFERENCE TO RELATED APPLICATIONS

This application is a continuation of PCT International Application No. PCT/EP2012/056629, filed Apr. 12, 2012, which claims priority under 35 U.S.C. §119 from German Patent Application No. DE 10 2011 017 118.5, filed Apr. 14, 2011, the entire disclosures of which are expressly incorporated by reference herein.

BACKGROUND AND SUMMARY OF THE INVENTION

The invention relates to a device for adapting the actual tire pressure of at least one tire of a wheel of an axle of a vehicle to a current setpoint tire pressure during travel.

Vehicles which are used under significantly different road conditions, such as metalled roads, off-road, sandy or marshy conditions, require the tire pressure to be adapted to the different operating conditions even during travel.

DE 38 36 105 A1 discloses a device for adapting the actual tire pressure of at least one tire of a wheel of an axle of a vehicle to a current setpoint tire pressure during travel, in which device a pressure control apparatus, which rotates with the wheels, is coupled by means of two lines to a chassis-side central controller. One line serves to inflate and vent the tires and the other line to control the wheel control units. For this reason, two rotational connections are also necessary between the chassis-side, rotationally fixed line parts and line parts which rotate with the wheel, which leads to high costs and to a low level of reliability because the rotational connections mentioned above are prone to leaks.

Furthermore, DE 3 836 105 A1 and DE 3 246 601 A1 each disclose a device for adapting the actual tire pressure to a current setpoint tire pressure during travel with just one line, where the individual line serves both for performing control and for inflating and venting the tires. Pressure pulses are necessary to open and/or close a wheel-side control valve apparatus, as a result of which the chassis-side central apparatuses are relatively complex. According to DE 2 630 511 A1 and DE 3 300 457 A1, the chassis-side central apparatuses are electronically controlled for this purpose, wherein such an electronic controller can be critical with respect to its reliability, in particular under extreme operating conditions which off-road vehicles are in fact subjected to.

DE 10 360 764 A1 discloses a device for adapting the actual tire pressure to a current setpoint tire pressure during travel, in which in order to vent the tires the compressed air is conducted into the open air through a venting opening of the wheel-side pressure control apparatus. This solution is disadvantageous because of the possible soiling of the venting opening, in particular when travelling through water or in the case of amphibious vehicles.

For example, DE 2 929 894 A1 discloses a solution in which overflow valves are used as 2/2-way valves that are spring-loaded into the closed position and loaded into the open position by the setpoint tire pressure in the wheel-side pressure control apparatus. This has the disadvantage that these valves open and close only within a relatively small pressure range ($p_{max}/p_{min}$ approximately 4:1), and only small through-flow cross sections are available during the venting of the tire at small pressure values, as a result of which the time period of the venting is very long.

EP 0 368 365 A1 discloses a solution in which the wheel-side pressure control apparatus is designed according to the principle of an overflow valve which is actuated pneumatically. However, the pneumatic actuation is intended to prevent the tire continuing to be inflated, and the compressed air container emptied, when the tire is damaged.

In DE 31 08 247 A1, an overflow valve, which is actuated pneumatically, is also used in the wheel-side pressure control apparatus. In this context, a ram pressure or differential pressure, which originates from a throttle formed in the supply line, is used as the control pressure. This principle has the disadvantage that in the case of low throttling, in order to avoid delaying the inflation and venting, the pressure range is also only relatively small, or in the case of more effective throttling the inflation and venting time is relatively long.

DE 2 823 045 A1 discloses a solution in which the inflation and venting are carried out by a pilot-controlled wheel control valve. Owing to the pilot control, rapid closing of the wheel control valve can take place, but only if the maximum permitted tire pressure is reached. When the tire pressures to be set are lower than the maximum permitted tire pressure, and in particular in the case of a reduction in the tire pressure, the pilot control is not active, with the result that the wheel control valve does not close until the minimum pressure occurs, wherein the closing pressure is defined by spring forces of spring device and is constant. In contrast, at pressures between the maximum and the minimum tire pressure, the wheel control valve remains open, as a result of which the lines and rotational connections are not pressure-relieved, which reduces the reliability.

The invention is accordingly based on the object of developing a device for adapting the actual tire pressure of at least one tire of a vehicle to a current setpoint tire pressure during travel in such a way that the device permits rapid adaptation of the pressure with a high level of reliability and a simple design.

This and other objects are achieved according to the invention by providing a device for adapting the actual tire pressure of at least one tire of a wheel of an axle of a vehicle to a current setpoint tire pressure during travel, comprising:

a) a chassis-side central apparatus which either feeds the current setpoint tire pressure into a connection, which rotates with the wheel, of an axle- or wheel-related pneumatic pressure control apparatus in order to adapt the actual tire pressure to the setpoint tire pressure, or vents this connection if the actual tire pressure is equal to the setpoint tire pressure, wherein the pressure control apparatus contains at least one further connection to which the actual tire pressure can be applied, b) at least one control valve having an open position which connects the one connection to the other connection and having a closed position which closes this connection, wherein the control valve is controlled pneumatically in opposite directions, and one of its pneumatic control connections is connected to the one connection, c) the pressure control apparatus contains at least one pilot control valve which performs pilot control of the control valve and which feeds either the pressure present at the one connection or the actual tire pressure present at the other connection into the other pneumatic control connection of the control valve or prevents such feeding in, d) the pilot control valve is controlled pneumatically at least by a pressure present at the one connection and/or at least by the actual tire pressure present at the other connection, and e) the pressure control apparatus has a bypass line which bypasses the control valve and the pilot control valve and connects the one connection to the other connection and has a nonreturn valve which opens in the inflation direction of the tire and closes in the venting direction of the tire.

The advantage of these measures is that, on the one hand, only a single line between the central apparatus and the pressure control apparatus, and therefore also only a single rotational connection per wheel, is necessary between the rotationally fixed line part and the rotating line part for the control and also for the inflation and venting. This has a favorable effect on the reliability of the device because the seal of such a rotational connection wears more quickly under pressure.

Overall, the rotational connection of the single line extending between the rotationally fixed line part and the rotating line part between the central apparatus and the pressure control apparatus is loaded merely in phases of the adaptation of the actual tire pressure to the setpoint tire pressure and is otherwise relieved of pressure, as a result of which the seal of the rotational connection is loaded only briefly.

With the device according to the invention, in order to adapt the actual tire pressure to a new setpoint tire pressure, all that is necessary is to load the one connection with the new setpoint tire pressure to be set, which permits a simple, cost-effective and reliable central apparatus.

Furthermore, the venting in order to reduce the actual tire pressure takes place via the line between the wheel-side or axle-side pressure control apparatus and the central apparatus on the chassis side, for which reason problems with the ingress of dirt or moisture in the case of venting through the wheel-side or axle-side pressure control apparatus are avoided.

With the solution presented here, the control valve of the pressure control apparatus serves preferably to adapt the tire pressure in a pressure range which is below a predefined pressure threshold value, wherein this pressure range is extended upward, that is to say for pressures higher than this threshold value, by virtue of the fact that the control valve is pilot-controlled by the pilot control valve.

The control valve is particularly preferably a pneumatic 2/2-way valve. The pilot control valve is likewise preferably a pneumatically controlled 2/2-way valve which has a closed position and an open position and which, in the open position, feeds either the pressure present at the one connection or the actual tire pressure present at the other connection into the other pneumatic control connection of the control valve and in its closed position prevents such feeding in.

According to one preferred embodiment, the pilot control valve can be loaded into the closed position by a spring device, which spring device is configured in such a way that the pilot control valve is held in the closed position for pressure values of the pressure at the one connection which are lower than an upper threshold value, and is switched to the open position for pressure values of the pressure at the one connection which are higher than or equal to the upper threshold value.

In this case, the control valve interacts with the pilot control valve in such a way that:

a) the control valve is switched to the open position and the pilot control valve is switched to the closed position for pressure values of the pressure present at the one connection which are lower than the upper threshold value, and b) the control valve is switched to the closed position and the pilot control valve is switched to the open position for pressure values of the pressure present at the one connection which are higher than or equal to the upper threshold value.

With these measures, a relatively high pressure setting range can be achieved for the setpoint tire pressure.

According to one alternative embodiment, the pilot control valve is a pneumatically controlled difference pressure valve which is loaded into the open position by the pressure present at the one connection and loaded into the closed position by the actual tire pressure present at the other connection. In this context, the pilot control valve can additionally comprise a spring device which prestresses it into the open position, wherein the pilot control valve is switched to the open position for pressure values of the pressure at the one connection which are higher than or equal to the actual tire pressure present at the further connection, and is switched to the closed position for pressure values of the pressure at the one connection which are lower than the actual tire pressure present at the further connection. As a result, a relatively high pressure setting range can also be achieved for the setpoint tire pressure which is present at the one connection.

As already indicated above, the one connection preferably constitutes a single connection for connecting the pressure control apparatus to the chassis-side central apparatus. The respective setpoint pressure is therefore fed into the pressure control apparatus via the single line between the chassis-side central apparatus and the wheel-related pressure control apparatus, a single rotational connection and a single chassis-side connection, which setpoint pressure at the same time forms the supply pressure for the respective tire and the control pressure for the pressure control apparatus.

The chassis-side central apparatus is therefore connected to the pressure control apparatus via a line which has an axle-side, rotationally fixed line part and a line part which rotates with the wheel, and a rotational connection between the rotationally fixed line part and the line part which rotates with the wheel.

According to one development, at least one pneumatic safety valve is connected, as a 2/2-way valve, between the control valve and the further connection, which pneumatic safety valve is loaded at its pneumatic control connection into the open position by the actual tire pressure present at the other connection, and is switched in a spring-loaded fashion to the closed position in the case of an actual tire pressure below a lower threshold value. In the event of a leak in the tire, further inflation of the tire can be prevented using such a safety valve by virtue of the fact that the actual tire pressure at the other connection then drops and the safety valve controlled by the actual tire pressure switches in a spring-loaded fashion to the closed position in order to decouple the damaged tire from the pressure control apparatus.

The pressure control apparatus preferably has an inflation connection for external application of pressure, this being arranged downstream of the control valve and the other connection in the inflation direction of the tire, so that the tire can be inflated by an external pressure source, for example if the actual tire pressure is below a minimum pressure value such as, for example, after the tire is fitted.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5 shows a pressure/time diagram of an adaptation process of the actual tire pressure to a setpoint tire pressure which is lower than the latter, using the device according to the invention.

DETAILED DESCRIPTION OF THE DRAWINGS

Figure 1:
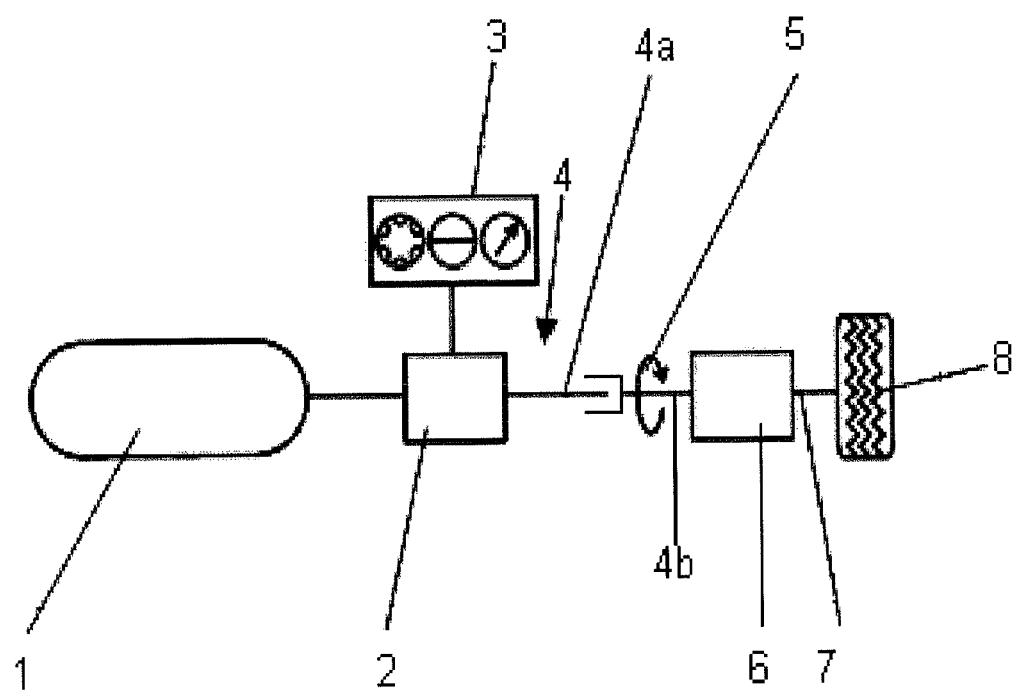
FIG. 1 shows a schematic circuit diagram of a preferred embodiment of a device for adapting the actual tire pressure of at least one tire of a wheel of an axle of a vehicle to a current setpoint tire pressure during travel.

The device shown in schematic form in FIG. 1 for adapting the actual tire pressure of at least one tire of a wheel of an axle of a vehicle to a current setpoint tire pressure includes a vehicle-side compressed air supply 1, an apparatus 3 for predefining the setpoint tire pressure, via which an operator can set a desired setpoint tire pressure for at least one tire of an axle during travel, as well as a chassis-side central apparatus 2.

For reasons of scale, only a single tire 8 of the two wheels which are usually arranged on one axle and which have associated tires is shown in FIG. 1. However, it is clear that the setpoint tire pressure of the second tire of the same axle or else the setpoint tire pressure of further tires of further axles can be adapted using the device shown in FIG. 1.

The central apparatus 2 feeds either the current setpoint tire pressure, predefined by the apparatus 3 for predefining the setpoint tire pressure, into a line 4 which has a rotationally fixed line part 4a, which, for example, runs within an axle body, and a line part 4b which rotates with the tire 8. Furthermore, the central apparatus 2 is designed in such a way that it vents the line 4 if the actual tire pressure has been adapted to the setpoint tire pressure. In this context, compressed air is transferred from the rotationally fixed line part 4a to the line part 4b which rotates along or in the opposite direction via a rotational connection 5 which has corresponding seals, in order to seal the two line parts 4a, 4b with respect to one another.

Figure 2:
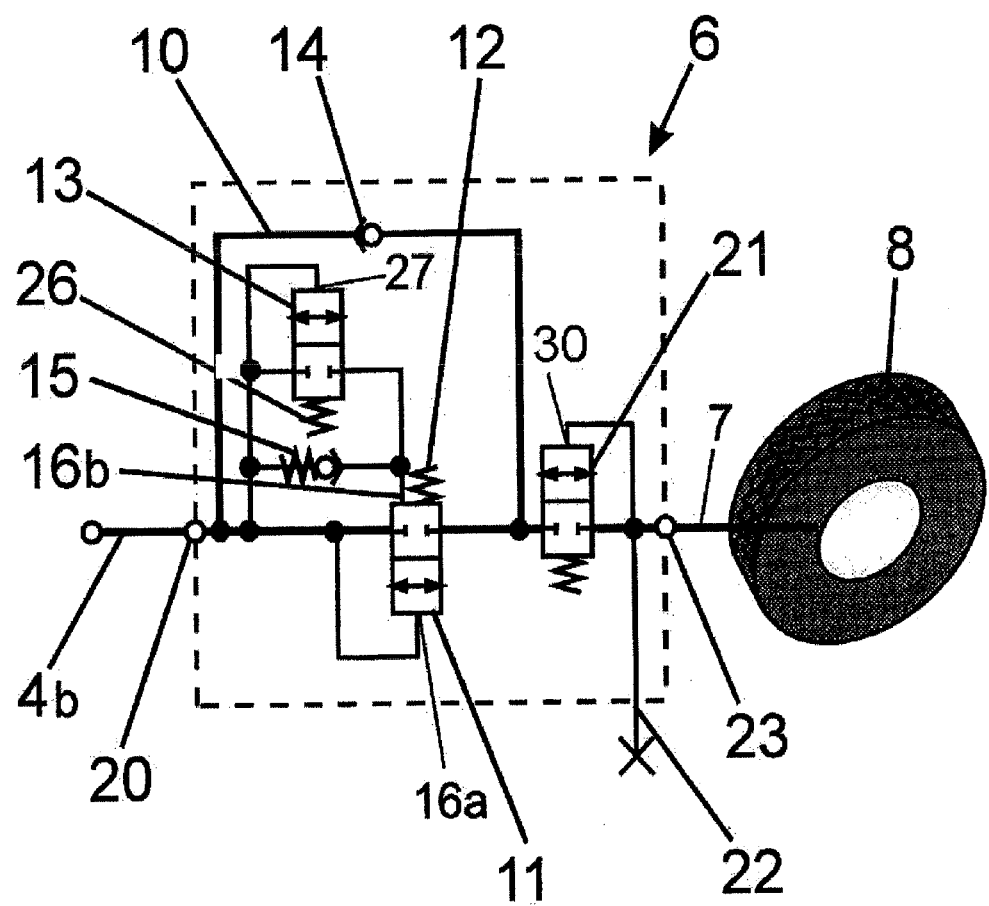
FIG. 2 shows a schematic circuit diagram of a pressure control apparatus of the device from FIG. 1 according to a preferred embodiment.

As is apparent from FIG. 2, the line part 4b which rotates with the tire 8 is connected in a pressure-conducting fashion to an axle-related or wheel-related pneumatic pressure control apparatus 6 via a connection 20. In other words, a separate pressure control apparatus 6 is provided per wheel or per pair of twin wheels. The pressure control apparatus 6 serves to adapt the actual tire pressure, present at another connection 23 of the pressure control apparatus 6, of the tire 8 or else of a plurality of tires 8 to the setpoint tire pressure which is fed into the line 4 or the connection 20. The connection 23 of the pressure control apparatus 6 therefore has a pressure-conducting connection to the interior of the tire 8 through a line 7.

The pressure control apparatus 6 has a control valve 11 as a pneumatically controlled 2/2-way valve with an open position which connects the one connection 20 to the other connection 23, and with a closed position which closes this connection, wherein one of its pneumatic control connections 16a is connected to the one connection 20.

The pressure control apparatus 6 also has a pilot control valve 13 which performs pilot control of the control valve 11 and which feeds the pressure present at the one connection 20 into the other pneumatic control connection 16b of the control valve 11 or prevents such feeding in.

The pilot control valve 13 itself is controlled pneumatically by the pressure present at the one connection 20 and therefore at its control connection 27. To be more precise, the pilot control valve 13 is a pneumatically controlled 2/2-way valve with a closed position and an open position which, in the open position, feeds the pressure present at the one connection 20 into the other pneumatic control connection 16b of the control valve 11, and in its closed position prevents such feeding in.

The control valve 11 is therefore controlled pneumatically in opposite directions at its two control connections 16a, 16b, wherein it is additionally prestressed into its closed position by spring device 12.

The pilot control valve 13 is loaded into the closed position by spring device 26 which is configured in such a way that said pilot control valve 13 is held in the closed position for pressure values of the pressure at the one connection 20 which are lower than an upper threshold value, and is switched to the open position for pressure values of the pressure at the one connection 20 which are higher than or equal to the upper threshold value. The upper threshold value for the pressure is, for example, 4 bar ($4\times10^5$ Pa).

The device 6 is preferably embodied in such a way that both low setpoint tire pressure values for off-road travel and relatively high setpoint tire pressure values can be set in an infinitely adjustable fashion for road travel. For example, setpoint tire pressure values of 1 to 4 bar can be selected for off-road travel, wherein the value 1 bar is used as a minimum value and 4 bar as a maximum value for off-road travel. In this context, any desired value between the extreme values of 1 bar and 4 bar can be selected for off-road travel as setpoint tire pressures. For road travel it is also possible to set setpoint tire pressure values of more than 4 bar, for example 6 bar.

The control valve 11 then interacts with the pilot control valve 13 in such a way that the control valve 11 is switched to the open position and the pilot control valve 13 to the closed position for pressure values of the pressure present at the one connection 20 which are lower than the upper threshold value (for example 4 bar), while the control valve 11 is switched to the closed position and the pilot control valve 13 to the open position for pressure values of the pressure present at the one connection 20 which are higher than or equal to the upper threshold value (for example 4 bar). The upper threshold value is therefore preferably formed here by the maximum pressure value of the setpoint tire pressure in the case of off-road travel.

A line with a nonreturn valve 15 is connected parallel to the control valve 11, between the connection 20 and the other control connection 16b of the control valve. The nonreturn valve 15 permits a return flow from the further control connection 16b to the connection 20, and blocks a flow in the opposing direction.

Furthermore, the pressure control apparatus 6 has a bypass line 10 which bypasses the control valve 11 and the pilot control valve 13 and connects the one connection 20 to the other connection 23 and has a nonreturn valve 14 which opens in the inflation direction of the tire 8 and closes in the venting direction of the tire 8. In other words, the nonreturn valve 14 blocks a flow from the tire 8 into the connection 20.

Not least, a pneumatic safety valve 21 is connected as a 2/2-way valve between the control valve 11 and the further connection 23, which safety valve 21 is loaded at its pneumatic control connection 30 into the open position by the actual tire pressure present at the further connection 23, and in the case of an actual tire pressure below a lower threshold value it is switched as a safety pressure in a spring-loaded fashion to a closed position. Furthermore, the pressure control apparatus 6 preferably has an inflation connection 22 for external application of pressure, and this is arranged downstream of the control valve 21 and the other connection 23 in the inflation direction of the tire 8. The safety valve 21 is embodied in such a way that it is held closed by spring force when there is a tire pressure below a minimum permitted pressure value, for example below 1 bar.

Against this background, the method of functioning of the device according to FIG. 2 is as follows:

In the case of a line 4 which is vented through the chassis-side central apparatus 2, i.e. when the actual tire pressure at the connection 23 corresponds to the setpoint tire pressure, the pilot control valve 13 and the control valve 11 are in their closed positions illustrated in FIG. 2. In contrast, the safety valve 21 is switched to the open position by the tire pressure present at its control connection 30. Since a flow through the control valve 11 is therefore prevented, and a flow through the bypass line 10 is also impossible because of the nonreturn valve 14 which blocks in this direction, the actual tire pressure, for example 2 bar, is enclosed in the tire 8.

If the actual tire pressure $p_{act}$ in the tire 8 is then to be increased from an actual tire pressure $p_{act}$ of 2 bar to a pressure of 3 bar, this pressure is firstly set by the apparatus 3 for predefining the setpoint tire pressure by an operator during travel at the time $t_1$ as a new setpoint tire pressure $p_{setp}$ and is fed into the connection 20 via the chassis-side central apparatus 2 and the line 4. A pressure p20, which is basically determined by the setpoint tire pressure but is also influenced temporarily by the compressed air flow, is present at the connection 20. This situation is represented by the pressure/time diagram in FIG. 4.

Figure 4:
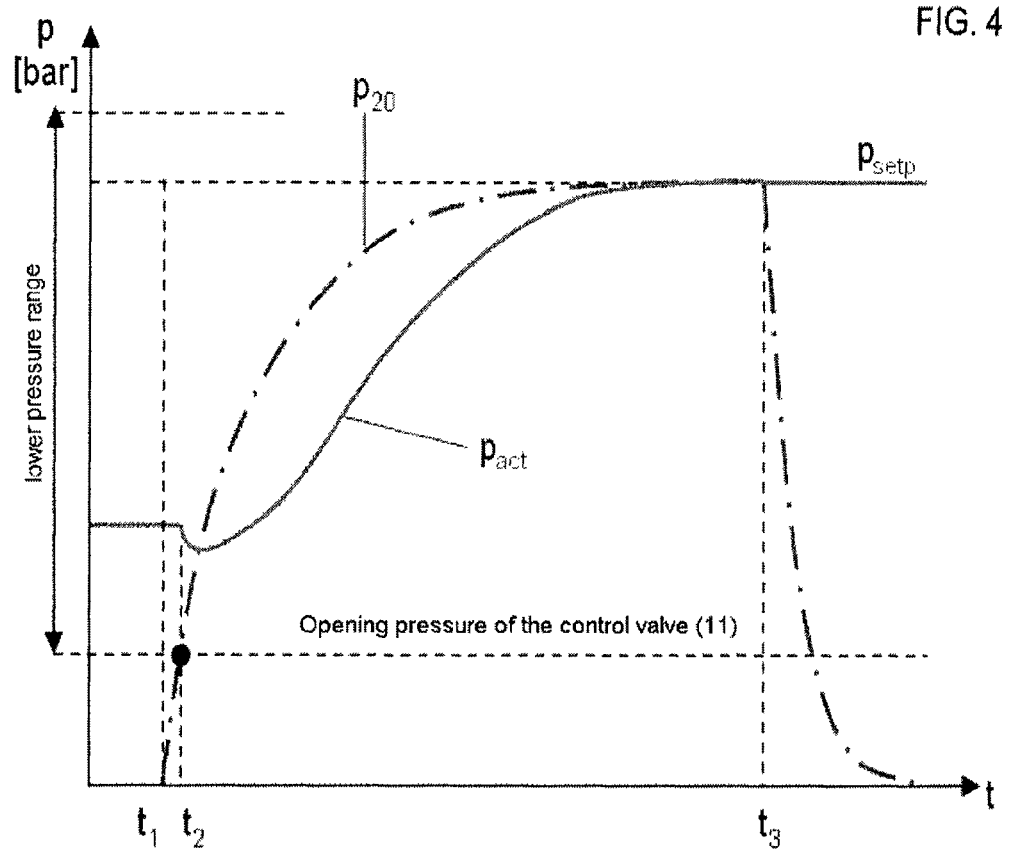
FIG. 4 shows a pressure/time diagram of an adaptation process of the actual tire pressure to a setpoint tire pressure which is higher than the latter, using the device according to the invention.

The control valve 11 or the spring device 12 thereof are set in such a way that in the lower pressure range (in the example of 1 to 4 bar) said control valve 11 is opened by the supply pressure or inflation pressure p20 at the connection 20 counter to the spring pressure of the spring device 12, with the result that pressure medium can flow from the connection 20 via the control valve 11 switched to the open position and the safety valve 21, which is also held in the open position, to the connection 23 and from there into the tire 8 in order to increase the actual tire pressure there starting from the time $t_2$ to 3 bar until the actual tire pressure $p_{act}$ corresponds to the setpoint tire pressure $p_{setp}$ at the time $t_3$. After this, the line 4 and the connection 20 are vented by the central apparatus 2, with the result that although the actual tire pressure $p_{act}$ is held at the new value 3 bar, the inflation pressure $p_{20}$ drops again, as illustrated in FIG. 4. Consequently, the inflation pressure $p_{20}$ constitutes, on the one hand, a control pressure for the pressure control apparatus 6, and in the time period $t_2$ to $t_3$ a predefinition for the actual tire pressure $p_{act}$ which is to be set.

The spring device 26 of the pilot control valve 13 is meanwhile embodied in such a way that the pilot control valve 13 cannot be switched to the open position counter to the spring forces for pressures present at its control connection in the pressure range from, for example, 1 to 4 bar, with the result that the pilot control valve 13 is held in the closed position by the spring forces of the spring device 26. The pressure at the other control connection 16b of the control valve 11 is therefore low and, when added to the spring forces of the spring device 12, is not capable of switching the latter over into the closed position counter to the control pressure at the one control connection 16a.

Depending on the spring force of the spring device loading the nonreturn valve 14, a parallel flow can also take place along the bypass line from the connection 20 to the connection 23.

If the setpoint tire pressure is then to be increased from 3 bar to values higher than 4 bar for road travel, this pressure is firstly set by the apparatus 3 for predefining the setpoint tire pressure by an operator during travel as a new setpoint tire pressure and is fed into the connection 20 via the chassis-side central apparatus 2 and the line 4.

The new setpoint tire pressure of 4 bar at the control connection 27 ensures there that the pilot control valve 13 is switched to an open position counter to the effect of its spring device 26. The new setpoint tire pressure at the other control connection 16b of the control valve 11 then ensures, together with the spring device 12, that the control valve 11 is switched to the closed position counter to the effect of the new setpoint tire pressure which is present in parallel at its one control connection 16a. Connection between the connection 20 and the connection 23 via the control valve 11 is then blocked. The pressure line from the connection 20 into the connection 23 is then formed via the bypass line 10, wherein the nonreturn valve 14 opens in this direction.

If a setpoint tire pressure higher than 4 bar is desired, the tire 8 can be inflated further by way of the bypass line 10 until the actual tire pressure is, for example, 6 bar, which is optimum for road journeys on metalled roads.

After the new setpoint tire pressure of, for example, 6 bar has been reached, the line 4 is vented by means of the central apparatus 2 which is embodied as a pressure control apparatus. In this context, the control valve 11 which is held in the closed position and the nonreturn valve 14 prevent a return flow from the tire 8 into the line 4. Furthermore, the control connection 27 of the pilot control valve 13 is relieved and is subsequently moved into the closed position by the spring device 26. The pressure at the control valve 11 is also relieved at its other control connection 16b by the nonreturn valve 15.

If, starting from a high setpoint tire pressure, a setpoint tire pressure which is reduced in comparison with the latter, for example a setpoint tire pressure between 1 bar and 4 bar for off-road travel, is desired, the new pressure value, for example 3 bar, must be set as a new setpoint tire pressure $p_{setp}$ by the apparatus 3 for predefining the setpoint tire pressure by an operator during travel, and must be fed into the connection 20 via the chassis-side central apparatus 2 and the line 4. This situation is illustrated in FIG. 5, where at the time $t_1$ the new setpoint tire pressure $p_{setp}$ is set at the connection 20, wherein the opening pressure of the control valve 11 at the time $t_2$ and the new value 3 bar for $p_{setp}$ are reached only later.

The control valve 11 is switched to the open position by the new pressure value 3 bar, as a result of which a return flow of compressed air from the tire 8 takes place through the safety valve 21, the control valve 11, the line 4 and to the central apparatus 2 which has a vent by which the excess pressure is vented. If the desired new pressure value is then reached at the time $t_3$, the line 4, the rotational connection 5 and therefore the connection 20 are vented by the central apparatus 2, as a result of which the inflation pressure $p_{20}$ drops and the control valve 11 is switched to the closed position by means of the spring force of its spring device 12.

If the actual tire pressure in the tire drops below the minimum pressure of, for example, 1 bar, for example to 0.8 bar, owing to a leak in the tire, the safety valve 21 closes due to spring force of its spring device, as a result of which inflation of the tire 8 is prevented. However, the tire 8 can then be inflated with external compressed air by means of the inflation connection 22.

Figure 3:
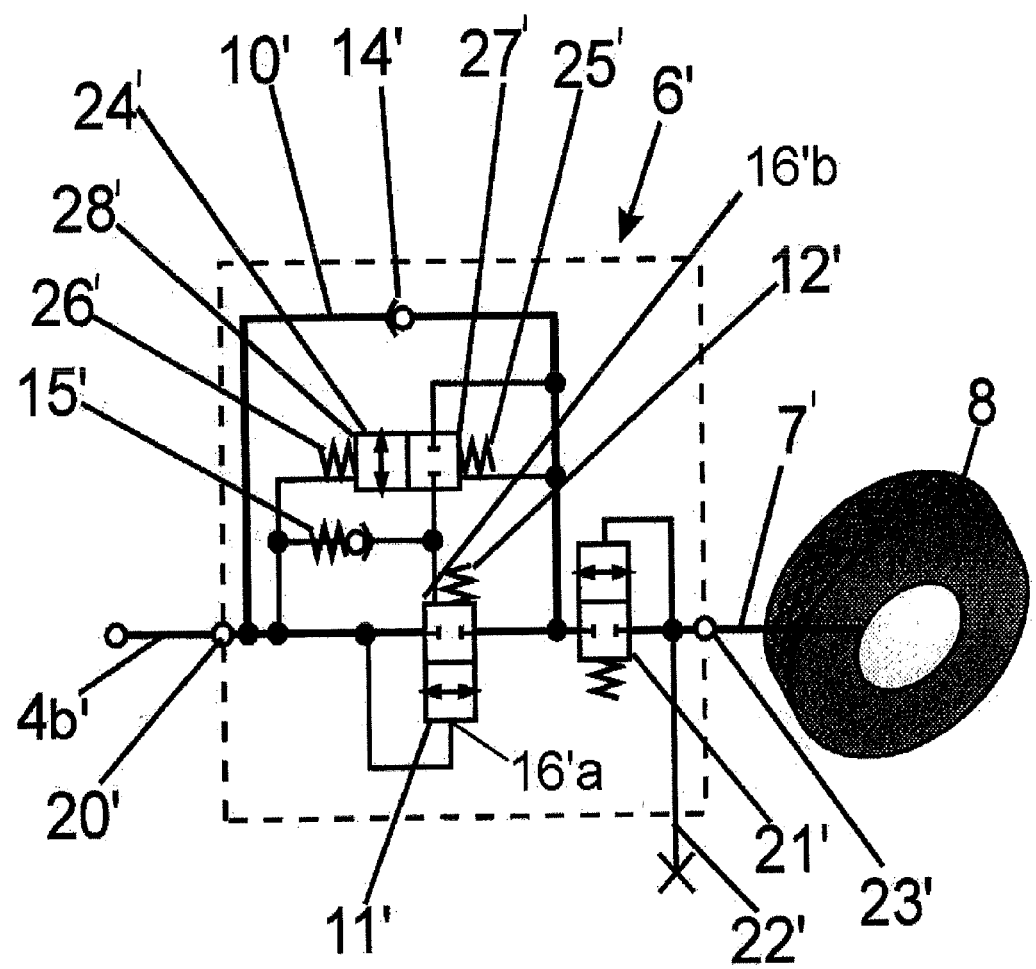
FIG. 3 shows a schematic circuit diagram of a pressure control apparatus of the device from FIG. 1 according to a further embodiment.

In the further exemplary embodiment which is shown in FIG. 3, identical or identically acting components and assemblies compared to the exemplary embodiment described above in FIG. 2 are characterized by the same reference numbers but with an apostrophe.

The pressure control apparatus 6' is, as in the exemplary embodiment specified above, installed in the line section 4b which also rotates, between the rotational connection 5' and the tire 8' and is connected by two connections 20', 23' to the lines 4b' and 7'. The pressure control apparatus 6' contains an overflow-valve-like control valve 11' which has in turn two pneumatic control connections 16a', 16b', and is loaded in the closing direction by spring device 12'. To this extent there is no difference from the embodiment in FIG. 1.

However, here a differential pressure valve 24' applies pressure to the control valve 11', to be more precise to its pneumatic control connection 16b'. As a result, the control valve 11' can be reliably closed even at relatively high pressure values above the pressure range 4:1, for example at pressures higher than 4 bar.

The differential pressure valve 24' is a 2/2-way valve with a closed position and open position, and is loaded by spring device 25', 26' into the closed position and into the open position. The spring device 25', 26' are configured in such a way that in a position of rest the differential pressure valve 24' is switched to the open position, i.e. when there are identical pressure loads on its two opposing pneumatic control connections 27', 28'. In this context, the one control connection 28' is connected to the connection 20 and is therefore subjected to the pressure which is modulated by the central apparatus 2. The other control connection 27' is coupled to the connection 23' and is therefore subjected to the actual tire pressure when the safety valve 21', also present here, is in the open position.

Consequently, the differential pressure valve 24' is in the open position when the pressure at the connection 20 is higher than or equal to the actual tire pressure $p_{act}$. In contrast, the differential pressure valve 24' is in the closed position when the pressure at the connection 20' is lower than the actual tire pressure $p_{act}$. If the differential pressure valve 24' is in the open position owing to a high pressure at the connection 20, the control connection 16a' is additionally subjected to the actual tire pressure in addition to the spring force of the spring device 12', and the control valve 11' is held closed or closed after a transition period. If, on the other hand, the line part 4b' or the connection 20' is vented, the control connection 16'b is relieved of pressure by the nonreturn valve 15' and its natural throttling, but with a delay.

Against this background, the method of functioning of the device according to FIG. 3 is as follows:

In the position of rest, the line 4b' is vented, that is to say the actual tire pressure is higher than the pressure in the line 4b'. The differential pressure valve 24' is in the closed position and the control connection 16'b of the control valve 11' is not under pressure, wherein the spring force of the spring device 12' holds the control valve 11' closed.

If an increase in pressure in the tire 8' is desired, the line 4b' is subjected to a higher pressure than the current actual tire pressure by the central apparatus 2. The tire 8' is then basically inflated by means of the bypass line 10' and the nonreturn valve 14'. The pressure at the control connection 28' is then higher than the pressure at the control connection 27', as a result of which the differential pressure valve 24' is switched to its open position, and the control connection 16'b of the control valve 11' is subjected to actual tire pressure. The actual tire pressure is increased by means of the subsequent flow through the bypass line 10' and the nonreturn valve 14' until the two pressures equalize, with the result that the control valve 11' closes and the line 4b' is relieved of pressure, and after a delay the control connection 16a' is relieved of pressure. A return flow cannot take place either through the nonreturn valve 14' or through the control valve 11'.

If a reduction in pressure in the tire 8' is desired, the line 4b' is subjected to a lower pressure than the current actual tire pressure by the central apparatus 2. The differential pressure valve 24' and also the nonreturn valve 15' remain closed, and the control connection 16'b is not subjected to pressure. The pressure which is modulated by the central apparatus 2 opens the control valve 11' and therefore permits a reduction in pressure in the tire 8'. If the actual tire pressure is then approximated to the pressure which is modulated by the central apparatus 2, the differential pressure valve 24' is opened and the control connection 16a' of the control valve 11' is subjected to pressure, as a result of which the latter is closed. The line 4b' is then relieved of pressure and after a delay the control connection 16'b is relieved of pressure.

The pressure control apparatus 6' according to FIG. 3 is also provided with a safety valve 21' and with an inflation connection 22', wherein with respect to the method of functioning reference is made to the corresponding statements relating to FIG. 2.

LIST OF REFERENCE NUMBERS

1 Compressed air supply
2 Central apparatus
3 Apparatus 3 for predefining the setpoint tire pressure
4 Line
4a Rotationally fixed line part
4b Line part which also rotates
5 Rotational connection
6 Pressure control apparatus
7 Line
8 Tire
10 Bypass line
11 Control valve
12 Spring device
13 Control valve
14 Nonreturn valve
15 Nonreturn valve
16a Control connection
16b Control connection
20 Connection
21 Safety valve
22 Inflation connection
23 Connection
24 Differential pressure valve
25 Spring device
26 Spring device
27 Control connection
28 Control connection
30 Control connection The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for adapting actual tire pressure of at least one tire of a wheel of an axle of a vehicle to a current setpoint tire pressure during travel, comprising:
   a wheel-related pneumatic pressure control apparatus having a first connection;
   a chassis-side central apparatus which is adapted to feed the current setpoint tire pressure into the first connection, which rotates with the wheel, of the wheel-related pneumatic pressure control apparatus in order to adapt the actual tire pressure to the setpoint tire pressure, and to vent the first connection if the actual tire pressure is equal to the setpoint tire pressure, wherein the pressure control apparatus comprises:
- a second connection to which the actual tire pressure is applicable,
- at least one control valve having an open position which connects the first connection to the second connection and having a closed position which disconnects the first and second connections, wherein the control valve is controlled pneumatically in opposite directions, and has one pneumatic control connection connected to the first connection,
- at least one pilot control valve which performs pilot control of the control valve and which feeds either the pressure present at the first connection or the actual tire pressure present at the second connection into the other pneumatic control connection of the control valve or prevents such feeding in, wherein
- the pilot control valve is controlled pneumatically at least by a pressure present at the first connection and/or at least by the actual tire pressure present at the second connection,
- a bypass line which bypasses the control valve and the pilot control valve and connects the first connection to the second connection and has a nonreturn valve which opens in the inflation direction of the tire and closes in the venting direction of the tire.

2. The device as claimed in claim 1, wherein the control valve is a pneumatic 2/2-way valve.

3. The device as claimed in claim 1, wherein the first connection constitutes a single connection for connecting the pressure control apparatus to the chassis-side central apparatus.

4. The device as claimed in claim 1, wherein the chassis-side central apparatus is connected to the pressure control apparatus via a line which has an axle-side, rotationally fixed line part and a line part which rotates with the wheel, and a rotational connection between the rotationally fixed line part and the line part which rotates with the wheel.

5. A device for adapting actual tire pressure of at least one tire of a wheel of an axle of a vehicle to a current setpoint tire pressure during travel, comprising:
- a wheel-related pneumatic pressure control apparatus having a first connection;
- a chassis-side central apparatus which either feeds the current setpoint tire pressure into the first connection, which rotates with the wheel, of the wheel-related pneumatic pressure control apparatus in order to adapt the actual tire pressure to the setpoint tire pressure, or vents the first connection if the actual tire pressure is equal to the setpoint tire pressure, wherein the pressure control apparatus comprises:
  - a second connection to which the actual tire pressure is applicable,
  - at least one control valve having an open position which connects the first connection to the second connection and having a closed position which disconnects the first and second connections, wherein the control valve is controlled pneumatically in opposite directions, and has one pneumatic control connection connected to the first connection,
  - at least one pilot control valve which performs pilot control of the control valve and which feeds either the pressure present at the first connection or the actual tire pressure present at the second connection into the other pneumatic control connection of the control valve or prevents such feeding in, wherein
  - the pilot control valve is controlled pneumatically at least by a pressure present at the first connection and/or at least by the actual tire pressure present at the second connection,
  - a bypass line which bypasses the control valve and the pilot control valve and connects the first connection to the second connection and has a nonreturn valve which opens in the inflation direction of the tire and closes in the venting direction of the tire, and
- wherein the pilot control valve is a pneumatically controlled 2/2-way valve which has a closed position and an open position and which, in the open position, feeds either the pressure present at the first connection or the actual tire pressure present at the second connection into the other pneumatic control connection of the control valve and in its closed position prevents such feeding in.

6. The device as claimed in claim 5, wherein the pilot control valve is loaded into the closed position by a spring device, which spring device is configured such that said pilot control valve is held in the closed position for pressure values of the pressure at the first connection which are lower than an upper threshold value, and is switched to the open position for pressure values of the pressure at the first connection which are higher than or equal to the upper threshold value.

7. The device as claimed in claim 6, wherein the control valve is configured to interact with the pilot control valve such that:
- the control valve is switched to the open position and the pilot control valve is switched to the closed position for pressure values of the pressure present at the one connection which are lower than the upper threshold value, and
- the control valve is switched to the closed position and the pilot control valve is switched to the open position for pressure values of the pressure present at the one connection which are higher than or equal to the upper threshold value.

8. The device as claimed in claim 5, wherein the pilot control valve is a pneumatically controlled difference pressure valve which is loaded into the open position by the pressure present at the first connection and loaded into the closed position by the actual tire pressure present at the second connection.

9. The device as claimed in claim 8, wherein the pilot control valve additionally comprises a spring device which prestress it into the open position, wherein said pilot control valve is switched to the open position for pressure values of the pressure at the first connection which are higher than or equal to the actual tire pressure present at the second connection, and is switched to the closed position for pressure values of the pressure at the first connection which are lower than the actual tire pressure present at the second connection.

10. A device for adapting actual tire pressure of at least one tire of a wheel of an axle of a vehicle to a current setpoint tire pressure during travel, comprising:
- a wheel-related pneumatic pressure control apparatus having a first connection;
- a chassis-side central apparatus which either feeds the current setpoint tire pressure into the first connection, which rotates with the wheel, of the wheel-related pneumatic pressure control apparatus in order to adapt the actual tire pressure to the setpoint tire pressure, or vents the first connection if the actual tire pressure is equal to the setpoint tire pressure, wherein the pressure control apparatus comprises:
  - a second connection to which the actual tire pressure is applicable, at least one control valve having an open position which connects the first connection to the second connection and having a closed position which disconnects the first and second connections, wherein the control valve is controlled pneumatically in opposite directions, and has one pneumatic control connection connected to the first connection, at least one pilot control valve which performs pilot control of the control valve and which feeds either the pressure present at the first connection or the actual tire pressure present at the second connection into the other pneumatic control connection of the control valve or prevents such feeding in, wherein the pilot control valve is controlled pneumatically at least by a pressure present at the first connection and/or at least by the actual tire pressure present at the second connection, a bypass line which bypasses the control valve and the pilot control valve and connects the first connection to the second connection and has a nonreturn valve which opens in the inflation direction of the tire and closes in the venting direction of the tire, and a pneumatic safety valve is connected, as a 2/2-way valve, between the control valve and the further connection, which pneumatic safety valve is loaded at its pneumatic control connection into the open position by the actual tire pressure present at the second connection, and is switched in a spring-loaded fashion to the closed position in the case of an actual tire pressure below a lower threshold value.

11. The device as claimed in claim 10, wherein the pressure control apparatus has an inflation connection for external application of pressure to the tire.

* * * * *